(12) United States Patent
Van De Woestyne et al.

(10) Patent No.: US 11,589,496 B2
(45) Date of Patent: Feb. 28, 2023

(54) REPLANT ROUTING AND CONTROL OF A SEED PLANTING MACHINE

(71) Applicant: Deere & Company, Moline, IL (US)

(72) Inventors: Bradley W. Van De Woestyne, Wes Des Moines, IA (US); Timothy A. Wilcox, Cissna Park, IA (US)

(73) Assignee: Deere & Company, Moline, IL (US)

( * ) Notice: Subject to any disclaimer, the term of this patent is extended or adjusted under 35 U.S.C. 154(b) by 383 days.

(21) Appl. No.: 16/735,147

(22) Filed: Jan. 6, 2020

(65) Prior Publication Data

US 2021/0204467 A1 Jul. 8, 2021

(51) Int. Cl.
*A01B 79/00* (2006.01)
*A01C 21/00* (2006.01)
*A01M 7/00* (2006.01)
*G06Q 50/02* (2012.01)

(52) U.S. Cl.
CPC .......... *A01B 79/005* (2013.01); *A01C 21/005* (2013.01); *A01C 21/007* (2013.01); *A01M 7/0089* (2013.01); *G06Q 50/02* (2013.01)

(58) Field of Classification Search
CPC ..... A01B 79/005; A01B 79/00; A01C 21/005; A01C 21/007; A01C 21/00; A01M 7/0089; A01M 7/00; G06Q 50/02; G06Q 50/00
See application file for complete search history.

(56) References Cited

U.S. PATENT DOCUMENTS

| | | | |
|---|---|---|---|
| 2015/0105965 A1* | 4/2015 | Blackwell | A01B 69/008 701/28 |
| 2015/0278640 A1 | 10/2015 | Johnson et al. | |
| 2018/0027725 A1 | 2/2018 | Koutsorodi | |

FOREIGN PATENT DOCUMENTS

| | | |
|---|---|---|
| DE | 102016005023 A1 | 10/2017 |
| EP | 3057398 A1 | 8/2016 |
| EP | 3276544 A1 | 1/2018 |
| WO | WO2015057630 A1 | 4/2015 |
| WO | WO2017106874 A1 | 6/2017 |

OTHER PUBLICATIONS

European Search Report issued in counterpart application No. 20209900.8 dated May 28, 2021 (12 pages).

* cited by examiner

*Primary Examiner* — Christopher J. Novosad
(74) *Attorney, Agent, or Firm* — Joseph R. Kelly; Kelly, Holt & Christenson, PLLC

(57) ABSTRACT

A map generator generates a replanting map designating a particular area in a field in which it is recommended to add additional seeds. A function of the agricultural machine is then controlled based at least in part on the replanting map so as to facilitate planting additional seeds in the designated particular area.

20 Claims, 12 Drawing Sheets

REPLANT ROUTING AND CONTROL OF A SEED PLANTING MACHINE

FIELD OF THE DESCRIPTION

The present description relates to agricultural machinery. More specifically, the present description relates to the generation of a replanting map used to prompt operational functions of a seed planting machine.

BACKGROUND

From the perspective of many growers of crops, rainfall events are becoming more frequent and larger quantities of rain are falling. Such conditions are especially problematic for crop producers when a rainfall event occurs soon after planting because plants have only then just begun to grow. The seeds or sometimes even plants can be washed away when rainfall is heavy. Further, saturated soils can prohibit oxygen from respiring plant tissues, thereby causing an undesirable reduction in the number of plants that reach harvestability. For at least these reasons, rainfall events can negatively impact the intended density of plants within a seeded area.

Some growers attempt to replant seed in damaged areas where a reduction in the number of established plants is perceived as being likely to be below a desirable threshold. Of course, it is only worth it if the value of placing additional seed in the soil warrants the expense and effort of replanting. It can be a challenge to ascertain which areas within a damaged field are and are not ideal locations for replanting.

Choosing where in a field to replant is especially challenging for a seed machine operator that is making such judgement calls while simultaneously operating the basic navigation functions of the machine. Candidate areas for replanting are often spatially variable within the field. The topographic features in different areas are not always consistent. Rainfall quantity causes the degree of plant stand reductions to vary significantly from one area to another. Still further, it can be challenging to determine the precise transition between an area with an adequate plant per area ratio and an area where the ratio renders it desirable for replanting. Also, as equipment gets larger, it becomes increasingly more difficult to monitor the full extent of the equipment swath, and there is often considerable variability across the swath. These conditions make it even more difficult to make machine operation decisions on the fly in a way that enables precise planting control. With some or all of these considerations in mind, the operator must decide when and where to activate or deactivate (e.g., raise/lower) planter equipment. For at least these reasons, it is especially challenging for an operator of seeding equipment to optimize the replanting process.

The discussion above is merely provided for general background information and is not intended to be used as an aid in determining the scope of the claimed subject matter.

SUMMARY

A map generator generates a replanting map designating a particular area in a field in which it is recommended to add additional seeds. A function of the agricultural machine is then controlled based at least in part on the replanting map so as to facilitate planting additional seeds in the designated particular area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The distribution of seeds within a field can become undesirably inconsistent in some areas due to seed displacement or damage caused by rainfall events, especially in the early days following planting. This inconsistency then sometimes has a significant negative impact on crop yield in affected field areas. The present description does contemplate causes of this category of seeding inconsistency other than rainfall events. However, specific attention is drawn herein to the example of a rain event simply because it happens to currently be an increasingly common cause.

Vulnerability to seed displacement or damage in the days after planting is not really limited to any crop type or planting style. Affected crops may be of a type where seeds are planted in rows, such as corn. Or, the crop may be of a type where seeds are scattered in a more random configuration, such as alfalfa. All crop types are herein contemplated.

Figure 1:
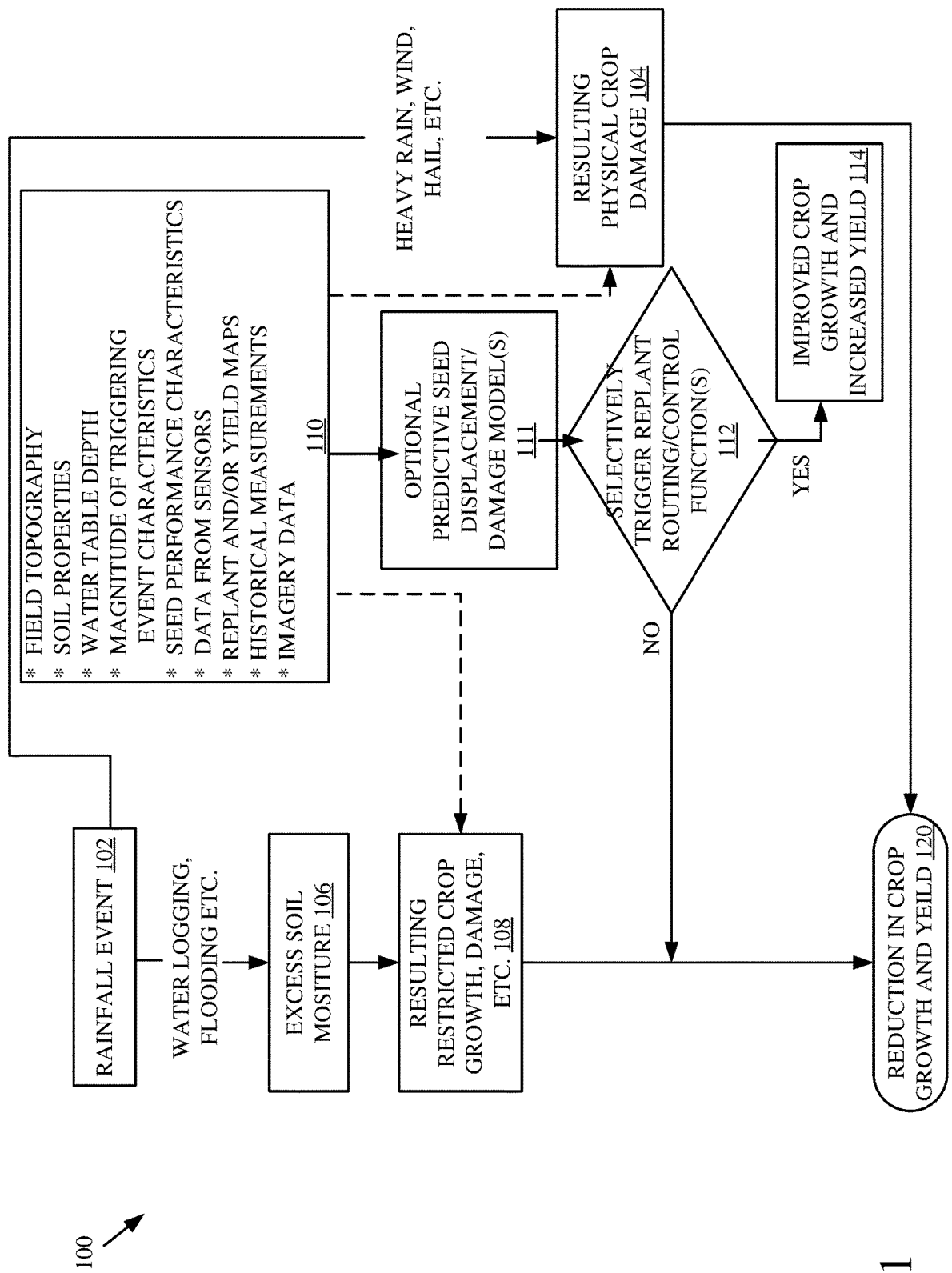
FIG. 1 is a block flow diagram showing an example of utilization of selective replanting to avoid a negative reduction in crop growth and yield.

FIG. 1 is a schematic flow diagram 100 demonstrating an example of how, in accordance with one aspect of this description, selective replanting is utilized to avoid a reduction in crop growth and yield. A rainfall event 102 illustratively includes an occurrence of heavy rain, wind, hail, or some other condition that causes resulting physical crop damage 104. Damage 104 could include, but is certainly not limited to, damage caused by seed displacement or a type of actual damage to the seed which causes negative growth characteristics. The damage 104 then in turn leads to a reduction 120 in crop growth and yield if no corrective action is taken.

Alternatively (or also), rainfall event 102 causes waterlogging, flooding, or some other condition that leads to excessive soil moisture 106. The excessive soil moisture 106 causes crop damage 108 due to restricted growth, displacement, damage, or some other negative impact on the seeds. Crop damage 108 in turn leads to the reduction 120 in crop growth and yield if no corrective action is taken.

It is ideal to avoid the reduction in crop growth and yield 120. In that regard, as is indicated by block 112, a machine has a controller that is programmed to selectively trigger one or more replant control functions. The nature of the controller and specific examples of what is signified by selective trigger block 112 will be discussed in greater detail below. However, the 'yes' scenario associated with selective trigger block 112 illustratively involves automatically routing a machine, controlling a machine function and/or providing machine operation choices, instructions, geographic directions, or replant recommendations to an operator of the machine. As is indicated by block 114, the control functions triggered in the 'yes' scenario are designed to lead to operation of the machine in a manner that leads to improved crop growth and an increase in yield. In other words, the 'yes' scenario is designed to partially or completely short circuit reduction 120 in crop growth and yield. The 'no' scenario associated with selective trigger block 112 illustratively involves taking no special actions and therefore has no impact on reduction 120.

Replanting the entire or most of a field would unfortunately be quite costly and time consuming. It is generally more efficient to selectively replant only especially damaged areas where the benefits of replanting are most likely to outweigh the cost. Even selective replanting is not necessarily time efficient, for example when choosing areas for replanting requires driving through all or most of a field. Thus, in one example, selective trigger block 112 also includes the controller being programmed to further identify in the 'yes' scenario which specific areas in the field to target for replanting operations, and even in which order to most efficiently move between the specific areas.

For example, the topography of a given field is often rough and irregular. Likely low yield field spots therefore can be difficult to spot with the naked eye. Thus, as is reflected by block 110, the controller programmed to selectively trigger replant control functions is further configured to factor characteristics of the field topography into the selection of the control functions. As is also indicated by block 110, field topography is not the only variable that the controller can take into the selection of control functions in conjunction with the 'yes' scenario. Other variables that play a role in the calculus include, not by limitation, any or all of soil properties, water table depth, and measurements of the magnitude of characteristics of the triggering event or events (e.g., wind direction, rainfall amounts, etc.). Still another variable that can be accounted for are the performance attributes of the already planted seeds and the seeds available for replanting. Other potential variables include historical images from past events (e.g., past rain events), historical or other replant maps, historical or other measurements, imagery, (e.g., includes terrestrial images taken from an aerial vehicle but also extraterrestrial sources like satellite), and historical or other yield maps. The present description is not limited to any set of variables, including those that are or are not described in the present description. As will be discussed in greater detail below in relation to other Figures, data gathered from a sensor, such as emerging plant locations ascertained from an image of the surface of the field may also or alternatively be factored into the analysis. Any variable that impacts the extent or location of field damage 104/108 may be considered and contemplated by the present description as a basis for programming the controller to make selections in accordance with selective trigger block 112.

In other example, as is indicated by block 111, the controller is optionally further configured to use one or more predictive models 111 in making replanting decisions in conjunction with selective trigger block 112. Models 111 are illustratively designed to identify, based on calculations using functions that factor in variables such as but not limited to those mentioned in relation to block 110, field areas where seed displacement and/or damage are most likely to occur or have occurred. In one example, models 111 are also configured to output a measurement of magnitude of field damage or crop yield degradation likely to occur or which has occurred in a field area. In one example, the programmatic calculus of selective trigger block 112 then involves comparing this magnitude value to a threshold value, this comparison driving part of the yes or no outcome based on objectively estimated costs and benefits associated with replanting in different areas of the field.

Figure 2:
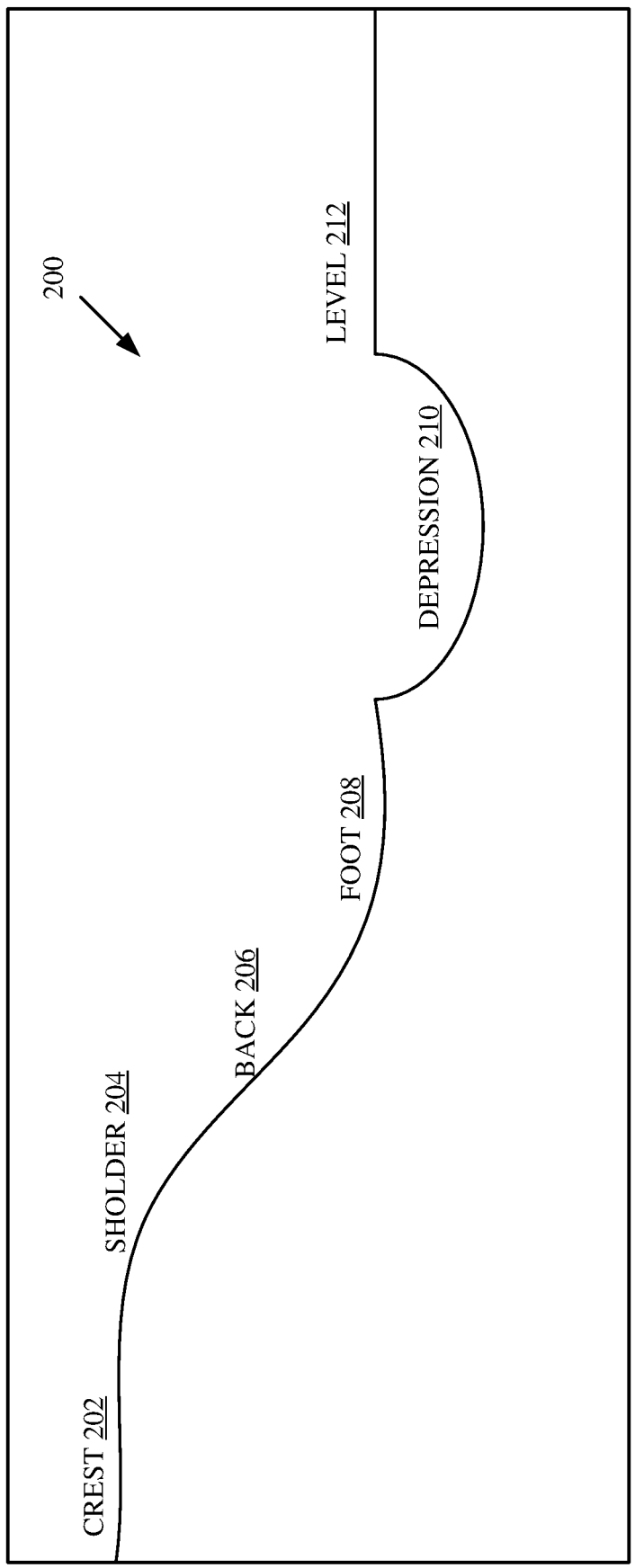
FIG. 2 is a schematic cross section of a field showing examples of topographical land features.

The use of field topography as a variable factored into the programmatic calculus of selective trigger block 112 is now discussed in greater detail. FIG. 2 is a schematic cross section of a field 200 demonstrating a high-level set of non-exclusive examples of the type of topographical land features that might exist within a given field where crops are planted. Field 200 includes a crest 202, a shoulder 204, a back 206, a foot 208, a depression 210, and a mostly level ground area 212. Seed distribution within and between these different field topographical features is likely to be affected differently by a rain event. The differences will also vary based on the magnitude of the rain event. For example, negative seed displacement or damage is more likely to occur in depression 210 due to water pooling. Seed is more likely to slip downhill in shoulder area 204 as a result of heavy rain. On the other hand, seed is perhaps most likely to stay in place and remain healthy in level area 212. In one example, the likelihood of seed displacement and/or damage is mathematically defined in one or more of the predictive models 111. Thus, in one example, the programmatic calculus reflected in the logic of the controller implementing the selective triggering of block 112 accounts for the impact of specific topographic field feature variables.

Figure 3:
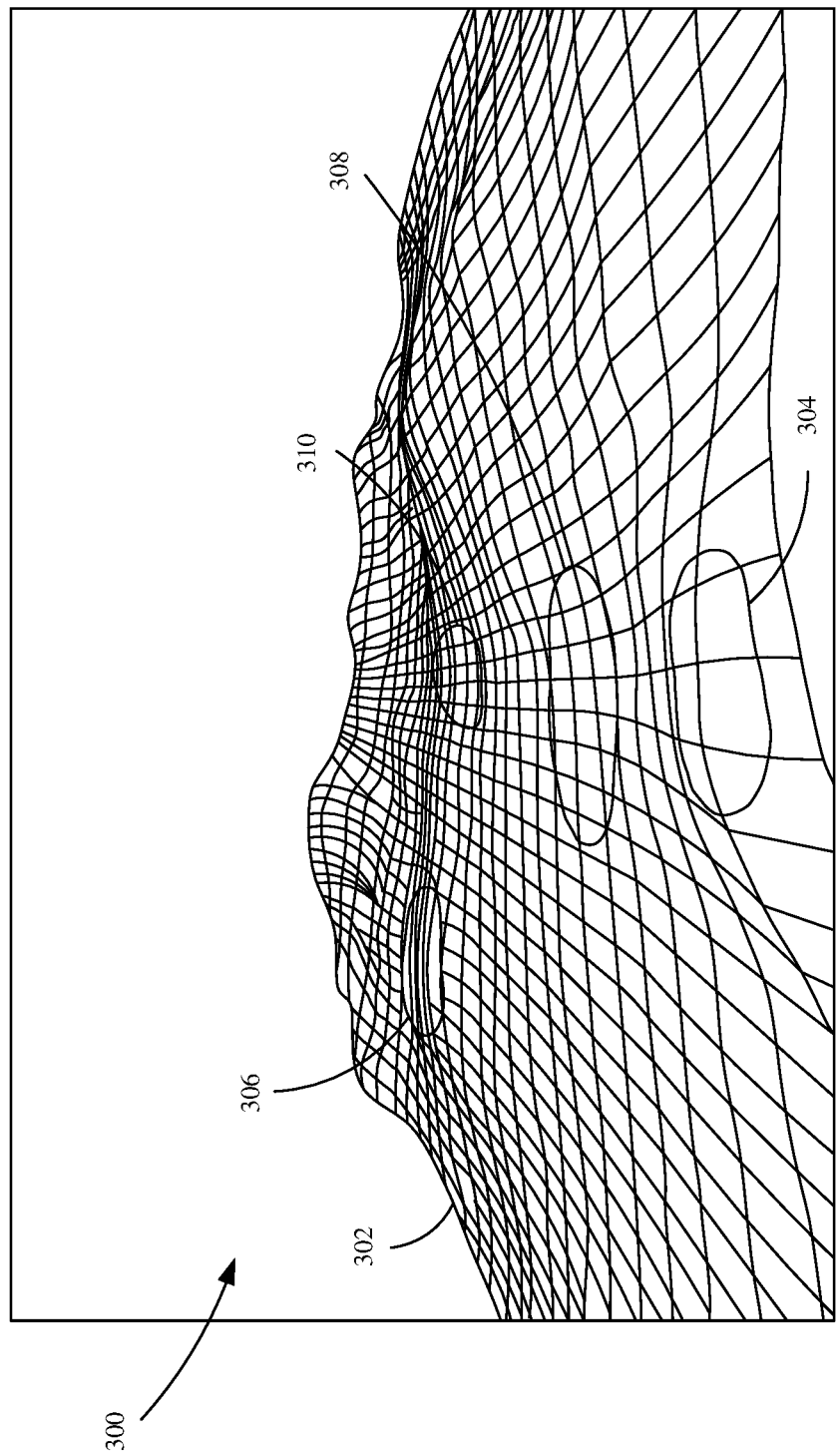
FIG. 3 is a schematic diagram showing an example of a topographical mapping of a field.

FIG. 2 is a simplified example. FIG. 3 is an illustrative more detailed topographical data mapping 300 of a field 302. It is assumed, of course that field 302 corresponds to an actual field in the real world with topographical features substantially consistent with the illustrated features. The mapping 300 is image based but it is to be understood that a more data-driven representation of the topography of the field may also or alternatively be provided. For example, mathematical models of where slope changes occur, and at what rate, may also or alternatively be made available. In another example, relative ground heights at different points throughout the field are made available. The type of data provided will vary depending at least upon the technical capabilities of the means utilized to gather the data. Regardless, data in the nature of mapping 300 is an illustrative example of what can be factored into the predictive models 111 and/or otherwise the programmatic calculus reflected in the logic of the controller implementing the selective triggering of block 112.

Detailed, field-specific topographical information in the nature of data mapping 300, is gatherable utilizing any of a variety of different devices and technologies. In one example, it is gathered by way of an aerially conducted survey, which may include manned or unmanned operations.

In another example, the data is gathered manually or semi automatically by a person conducting an on-the-ground land survey utilizing traditional or modernized tools. In still another example, the data is gathered as a field is worked by one or more machines outfitted with sensors for gathering such data during normal agricultural operation. These are just examples of devices and technologies that can be utilized to gather data such as that shown in mapping 300. The scope of the present description is not limited to these examples.

With still further reference to FIG. 3, it is assumed for illustrative purposes that field 302 includes at least some of the example topographical land features shown in FIG. 2. For example, an area 304 in field 302 is assumed to have a topographical profile that is plateau in nature with a feature like level area 212 in the center and transitions of shoulder 204, back 206 and foot 208 there around. An area 306, on the other hand, is assumed to include a level area 212 in the center surrounded by only a very mild shoulder 204 that transitions gently to surrounding areas. Finally, areas 308 and 310 are assumed to be sunken areas similar in nature to depression 210. Of course, these topographic features are provided herein for example purposes only. Different fields will obviously have different topographic characteristics.

The examples to this point have been described without the context of any specific agricultural machine with which the control logic of block 112 in FIG. 1 is implemented. In one more specific example scenario, not by limitation, an operator of a seed planting machine is provided with guidance (automatically generated in accordance with block 112) as to which areas in a field are likely to be good candidates for replanting and which are less likely to be so. For example, the operator is illustratively guided to strongly consider replanting within areas 308 and 310 but not within area 306 and perhaps only within the sloped portions of area 304. Guiding the operator means, in one example, providing information and instructions to the operator through a computing device interface. On the other hand, in another example, guiding the operator also or alternatively means automatically taking full or partial control of one or more functions of the seed planting machine with or without an input from the operator expressing approval for the taking of control automatically.

The programmatic logic, of which many additional examples are described in greater detail below in relation to other Figures, illustratively determines and effectuates an operations approach based on a recommend replanting path through the field. This path is programmatically influenced by a variety of different factors such as records of topographical or other field description data, prior planting or replanting operations, and planting configuration features such as data detailing characteristics of emerging plants and/or rows. Other data considerations such as, but not limited to plant spacing and planting methods are factored into the programmatic logic of a micro replanting operation approach.

Figure 4:
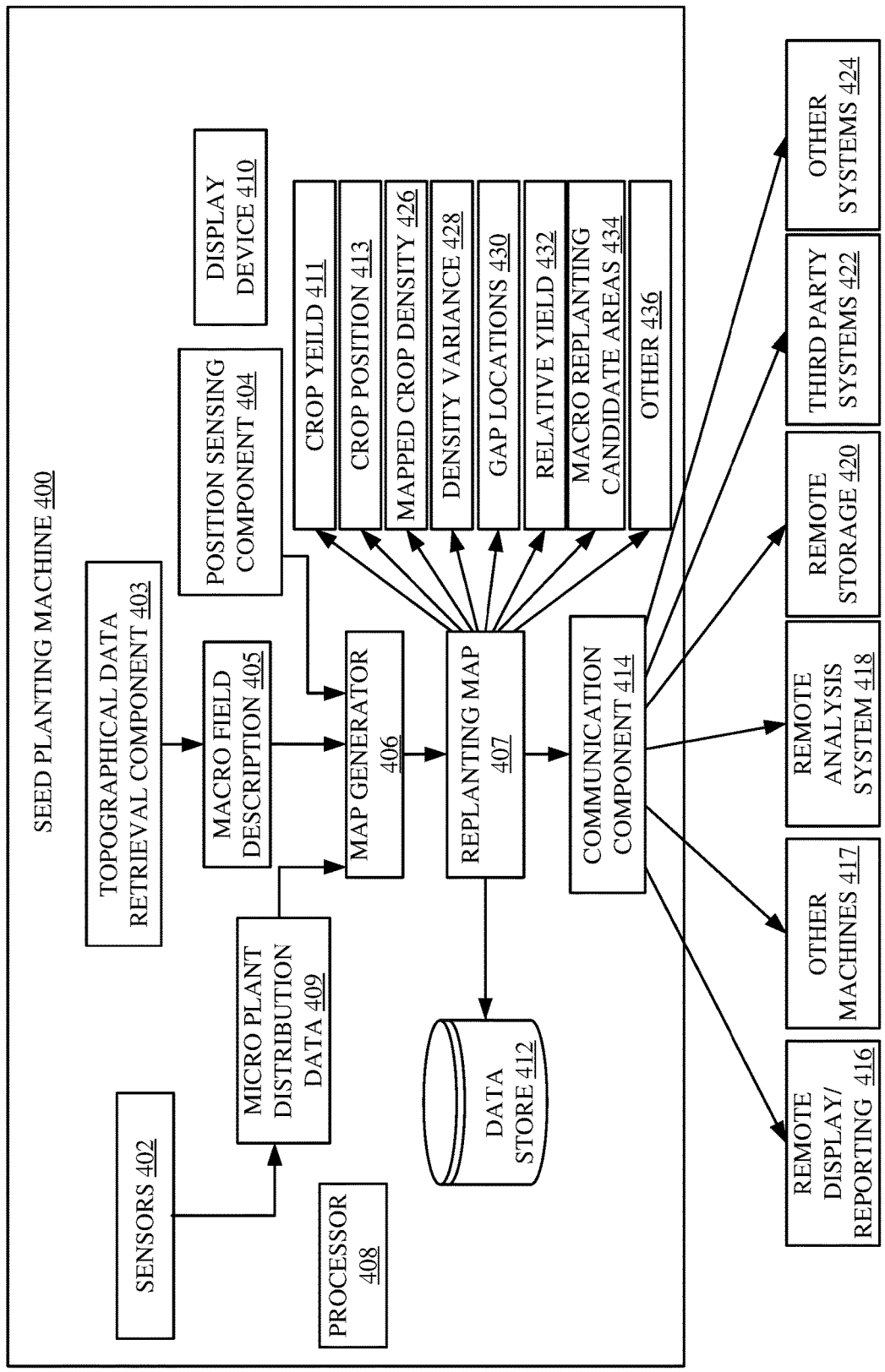
FIG. 4 is a block diagram demonstrating an example of various components of a seed planting machine.

FIG. 4 shows a seed planting machine 400 that includes sensors 402, a topographic data retrieval component 403, and an optional position sensing component 404. Machine 400 also includes a map generator 406 that utilizes a processor 408 to generate all or a portion of a replanting map 407, which may be stored and updated in a data store 412. Machine 400 also includes a display device 410 and a communication component 414. Communication component 414 illustratively enables communication with any of a remote display or reporting device 416, other machines 417, a remote analysis system 418, remote storage 420, third-party systems 422, or with other systems 424.

The generation of the replanting map 407 is an illustrative implementation of the control logic described above in relation to the selective trigger block 112 of FIG. 1. Thus, the replanting map 407 reflects the outcome of calculated determinations as to whether (and where) replanting operations are recommended within a corresponding planted field. Examples of replanting map 407 generation will now be provided in greater detail.

A macro field description 405 of field characteristics is illustratively provided from component 403 as an input to map generator 406 such that features of the macro field description 405 are calculated into the details of replanting map 407. In one example, processor 408 retrieves or derives the macro field description 405 from an information source in the data store 412 or in remote storage 420. Alternatively, the macro field description 405 is retrieved or derived from data in a third-party system 422 that is a repository of information generated by a third-party source, such as a repository of topographical data provided by a commercial, governmental, or other public service entity. Another possibility is that the macro field description 405 is retrieved or derived from a repository of topographical data maintained on another machine 417, such as another computing device or an agricultural machine that has collected topographical data using sensors during its normal operation. In still another example, the macro field description 405 is retrieved or derived from data collected by sensors 402 or by one or more remote analysis systems 418 or associated sensors. These are only examples of sources from which the macro field description 405 is retrieved or derived. Other sources 424 are also contemplated.

In one still more specific example, the macro field description 405 is retrieved or derived from field data collected directly or indirectly from data collection systems operating onboard a manned or unmanned aerial vehicle (UAV). This data collection operation is illustratively, though not by limitation, done in real time while machine 400 is located and operating within the field where replanting operations are being actively conducted. In this manner, the data collected from the in-the-air perspective is illustratively factored into where is best to move machine 400 and conduct targeted replanting, for example, as guided by a generated version of replanting map 407.

The format of macro field description 405 can vary from one application to another. However, one example of the nature of macro field description 405 is the data mapping 300 discussed above in relation to FIG. 3. Of course, the format is likely to be more data driven than visual in nature, in order to support determinations as to where are ideal locations to move machine 400 and conduct targeted replanting operations, for example as guided by a generated version of replanting map 407. The macro field description 405 can be formatted in any manner appropriate for calculative consideration that informs at least a portion of replanting map 407.

It is contemplated that processor 408 be utilized to generate all or a portion of replanting map 407. Of course, such an operation could also be carried out completely or partially by a remotely situated processor, with results of calculations being transferred to machine 400, for example via communication component 414. Regardless, a portion of the generated replanting map 407 illustratively includes a designation of field areas that are likely to be good macro replanting candidate areas 434. The content of the generated replanting map 407 is not restricted to data in this category.

For example, it may also or alternatively include other calculated attributes of field areas such as the area of each macro cell and/or a measure of the level of the severity of damage to that area. Of course, these are just examples.

The macro replanting candidate areas 434 are illustratively selected based on calculations using functions that include as a variable at least one characteristic of a topographical field feature. In one example, one of these functions is designed to predict, based at least in part on a characteristic of a topographical feature in the field, a location in the field where seed per area proportionality is likely to be below a threshold value. In a more specific example, again in the context of the example of field 302 represented in FIG. 3, macro candidate areas 434 are calculated to include areas 308 and 310 but not area 306, and then only the sloped portions of area 304.

An operator of seed planting machine 400 is illustratively provided with an indication of all or a portion of replanting map 407 on display device 410. In one example, this includes providing navigational guidance to assist the operator in moving the seed planting machine 400 to an area in the field that corresponds to a macro reseeding candidate area 434. Position sensing component 404 optionally assists in this regard by sensing and providing as a navigational input the relative position and heading of the seed planting machine 400. In other examples, the seed planting machine is alternatively configured to provide navigational information on display device 410 as the machine automatically or semi-automatically drives itself to a reseeding candidate area 434, illustratively with assistance from navigational input from position sensing component 404. In another example, the processor 408 is configured to calculate a desirable navigation path efficiency between one or more candidate areas 434, which is factored into navigational guidance automatically acted upon or at least provided to the operator.

Thus, the processor 408 of machine 400 is configured to facilitate guidance of machine 400 to and even efficiently between two or more macro replanting candidate areas 434 in a planted field. However, an additional, more precise level of replanting guidance of machine 400 is also contemplated. For example, a micro category of replanting guidance can be provided upon a determination that machine 400 has arrived at one of the macro replanting candidate areas 434, though the micro guidance could just as easily be provided first or exclusively.

In a more specific example of this micro category of guidance, one or more of sensors 402 are configured to facilitate a visual scan of the surface of the field, and data from that scan is then utilized to support generation of micro plant distribution data 409. Micro plant distribution data 409 illustratively describes the spacing and distribution of plants that have sprouted from seeds previously planted in the field, the plants having visibly emerged from the soil during an early stage in the growing process. Thus, the sensor 402 in this case is an image detection system, such as but not limited to an image data collector and an associated image component detection system tuned to pick out plant locations and configurations. Map generator 406 illustratively receives this data (i.e., micro plant distribution data 409) and utilizes processor 408 to produce corresponding portions of map 407. Of course, any part of the image detection system could just as easily be remotely situated instead of carried onboard machine 400, optionally with the information being transferred into machine 400 via communication component 414.

Data 409 can be received by the map generator 406 directly or may instead be derived from received data. Alternatively, the data 409 can be retrieved from (or derived from data in) onboard data store 412, or retrieved from (or derived from data in) remote storage 420, or retrieved from (or derived from data received from) a remote analysis system 418. In another example, the micro plant distribution data 409 is retrieved or derived by processor 408 from a repository of data maintained on another machine 417, such as another agricultural machine that has collected topographical data using sensors during its normal operation. These are just examples of sources from which the micro plant distribution data 409 is retrieved or derived. Other sources 424 are also contemplated.

In one still more specific example, the micro plant distribution data 409 is retrieved (or derived from data received from) an image or other data collection system operating onboard a manned or unmanned aerial vehicle (UAV). This mode of data collection is illustratively, though not by limitation, done in real time while machine 400 is located and operating within the field where replanting operations are being actively conducted. In this manner, the data collected from the in-the-air perspective is illustratively factored into map 407 and therefore into the determination as to where is best to targeted reseeding.

In another more specific example, the micro plant distribution data 409 is retrieved (or derived from data received from) a forward-facing image or other data collection system mounted on the front of machine 400. In this case, the ground is illustratively scanned in front of machine 400 during active reseeding operations. Of course, the image data is illustratively fed into an image detection algorithm that facilitates the generation of corresponding micro plant distribution data 409, which is factored into map 407 and therefore into the determination as to where is best to target reseeding. This is simply another contemplated possibility.

In one example scenario, the portions of map 407 generated based on micro plant distribution data 409 include a projected crop yield value 411, for example calculated by processor 408 based on sensed plant distribution in one or more areas within the field. Alternatively (or also), the corresponding map portion includes crop positioning information 413 indicative of where crops are located in the field, how they are organized (in rows, scattered, etc) and/or whether or not certain crop instances are within good candidate areas for reseeding. Alternatively (or also), the corresponding map portion includes mappings 426 of crop density in one or more areas of the field. Alternatively (or also), the corresponding map portion includes an indication 428 of crop density variance in one or more areas of the field. Alternatively (or also), the corresponding map portion includes an indication 432 of relative crop yield values across different areas within the field. These are just examples of components of map 407. Other components 436 could be included. Of course, an onboard processor (e.g., processor 408) or an offboard processor (e.g., part of a system 418) is illustratively configured to support generation of the data derived based on the micro plant distribution data 409.

Regardless of the format of the portions of map 407 generated based on the micro plant distribution data 409, these portions are illustratively utilized by processor 408 as a basis to automatically provide a user with replanting instructions or guidance. For example, these portions can be utilized by processor 408 as a basis for automatically transitioning machine 400 into or out of an active planting state. This can mean processor 408 facilitating automated transition of a physical planting equipment apparatus that is part of machine 400 into a raised non-planting position or into a lowered active planting position. In other examples, the transition into or out of an active planting state is instead more semi-automatic in nature, such as where an operator of the machine 400 approves or initiates the physical transition into or out of the active planting state in conjunction with replanting instructions or guidance provided, for example on display device 404 or a remote display 416.

In another example, the portions of map 407 generated based on micro plant distribution data 409 reflect a comparison of an objective micro plant characteristic to one or more threshold values that lead ultimately to the determination as to whether and when to transition machine 400 into or out of an active planting state. In one example, not by limitation, these portions of map 407 are representative of an estimated number of plants per area, which is compared (e.g., by processor 408) to a threshold value representing a minimum number of plants per area required to support a conclusion that replanting in the area is not warranted. If the calculation produces an estimated number of plants per area that is above the threshold, the processor facilitates transition to the non-active planting state. If the calculation produces an estimated number of plants per area that is below the threshold, then the processor facilitates transition to the active planting state. This is just an example. The trigger for the processor to automatically facilitate a transition between active an inactive planting states could alternatively be based on any or all of data 411, 413, 426, 428, 430, 432, 434, 436. Also, the triggered response could just as easily be a triggering of a semi-automatic transition or a provision of replanting guidance or instructions to a user.

Figure 5B:
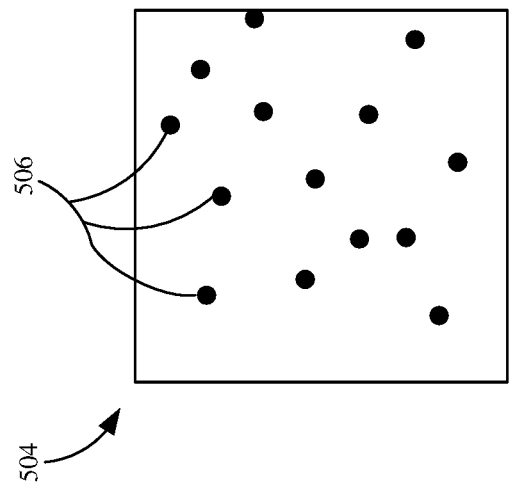
FIGS. 5A-5D are schematic representations that each show an example of micro plant distribution data.
Figure 5D:
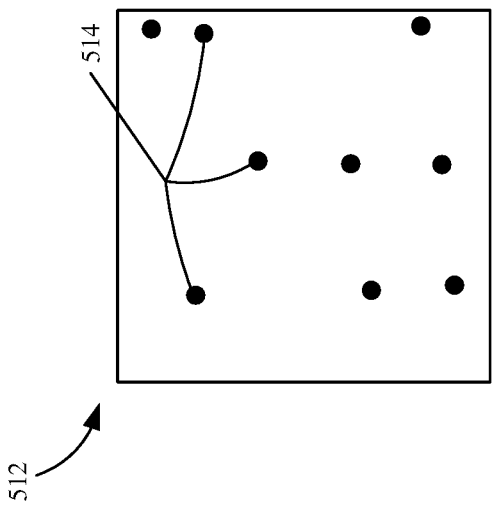
Figure 5A:
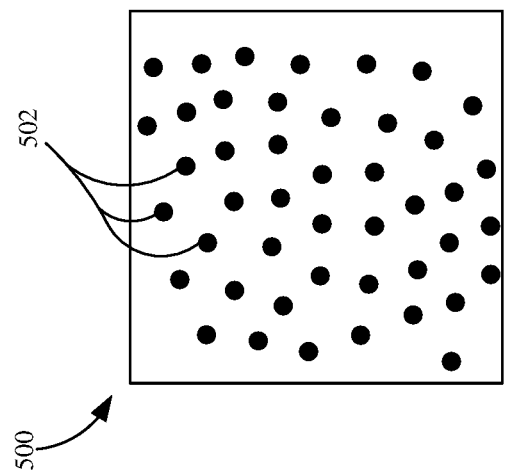

FIG. 5A is a schematic representation 500 of an example of micro plant distribution data 409 detailing plant locations 502. In examples of how this data is compiled, but not by limitation, a camera sensor 402 mounted to machine 400 or perhaps an aerial vehicle is utilized to capture images from a field, from which corresponding plant locations 502 are derived. Data from machine position sensing component 404 is, in one example, utilized to add relative mapping or similar positioning information to the plant locations 502. One or more plant locations 502 illustratively (though not necessarily) has its location mapped in data 409 in relation to a reference plane. In one example of such a configuration, a GPS coordinate location is tracked in relation to one or more locations 502.

FIG. 5B is a schematic representation 504 of an example of different micro plant distribution data 409 detailing plant locations 506. In one example of how this data is compiled, but not by limitation, a camera sensor 402 is mounted to machine 400 or perhaps an aerial vehicle is utilized to collect image data from which plant locations 506 are derived. Data from machine position sensing component 404 is, in one example, utilized to add relative mapping or similar positioning information to the plant locations 506. One or more plant locations 506 illustratively (though not necessarily) has its location mapped in data 409 in relation to a reference plane. In one example of such a configuration, a GPS coordinate location is tracked for one or more locations 506.

Representations 500 and 504 are illustratively derived from different locations in the same field. The crops in that field have illustratively been planted in a scattered configuration instead of being more organized, for example, in rows. Continuing with the example of field 300 in FIG. 3, the distribution of plants 506 in FIG. 5B is what is illustratively sensed by a sensor in area 310 and converted into representative plant distribution data 409. In contrast, the distribution of plants 502 in FIG. 5A is what is illustratively sensed by a sensor in area 306 and converted into representative plant distribution data 409.

In one example, a macro portion of map 407 triggers processor 408 to guide machine 400 to area 310 because it is calculated to be a macro replanting candidate area 434. This guidance of machine 400 can be automated control of machine 400, semi-automated control thereof, or by providing operation instructions or guidance to a user. Once machine 400 arrives in area 310, the micro portions of map 407 illustratively trigger the processor to guide machine 400 to be in an active replanting state because it is calculated that the distribution of plants 506 is such that replanting is desirable. This placement of machine 400 into the active replanting state can be automated control of machine 400, semi-automated control thereof, or by providing operation instructions or guidance to a user.

In contrast, the macro portion of map 407 does not trigger processor 408 to guide machine 400 to area 306 because it is calculated to not be a macro replanting candidate area 434. This guidance of machine 400 can be automated control of machine 400, semi-automated control thereof, or by providing operation instructions or guidance to a user. If machine 400 is moved into area 306, the micro portions of map 407 illustratively trigger the processor to guide machine 400 to be in an inactive replanting state because it is calculated that the distribution of plants 502 is such that replanting is not desirable. This placement of machine 400 into the inactive replanting state can be done through automated control of machine 400, semi-automated control thereof, or by providing operation instructions or guidance to a user.

Figure 5C:
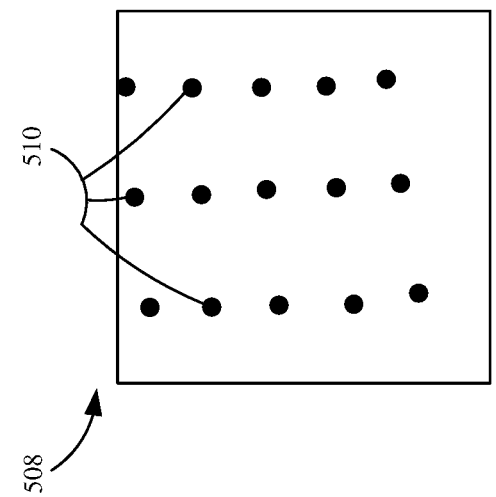

Again, applicability to most all of types of crops and seeding arrangements are contemplated. In that regard, FIG. 5C is a schematic representation 508 of a different example of micro plant distribution data 409 detailing plant locations 510, illustratively a row crop (e.g., corn) planted in a row by row configuration. Similarly, FIG. 5D is a schematic representation 512 of an example of different micro plant distribution data 409 detailing plant locations 514, also illustratively a crop planted in a row by row configuration. The information in these examples is collected in a manner that may be the same or similar to the gathering of data described in relation to the scattered seed plant configurations of FIGS. 5A and 5B.

Representations 510 and 514 are illustratively derived from different locations in the same field. Again, continuing with the example of field 300 in FIG. 3, the distribution of plants 510 in FIG. 5C is what is illustratively sensed by a sensor in area 310 and converted into representative plant distribution data 409. In contrast, the distribution of plants 514 in FIG. 5D is what is illustratively sensed by a sensor in area 306 and converted into representative plant distribution data 409.

In one example, a macro portion of replanting map 407 triggers processor 408 to guide machine 400 to area 310 because it is calculated to be a macro replanting candidate area 434. This guidance of machine 400 can be automated control of machine 400, semi-automated control thereof, or by simply providing operation instructions or guidance to a user. Once machine 400 arrives in area 310, the micro portions of map 407 illustratively trigger the processor to guide machine 400 to be in an active replanting state because it is calculated that the distribution of plants 514 is such that replanting is desirable. This placement of machine 400 into the active replanting state can be automated control of machine 400, semi-automated control thereof, or by providing operation instructions or guidance to a user.

In contrast, the macro portion of map 407 does not trigger processor 408 to guide machine 400 to area 306 because it is calculated to not be a macro replanting candidate area 434. This guidance of machine 400 can be automated control of machine 400, semi-automated control thereof, or by providing operation instructions or guidance to a user. If machine 400 is moved into area 306, the micro portions of map 407 illustratively trigger the processor to guide machine 400 to be in an inactive replanting state because it is calculated that the distribution of plants 510 is such that replanting is not desirable. This placement of machine 400 into the inactive replanting state can be automated control of machine 400, semi-automated control thereof, or by providing operation instructions or guidance to a user.

Figure 6:
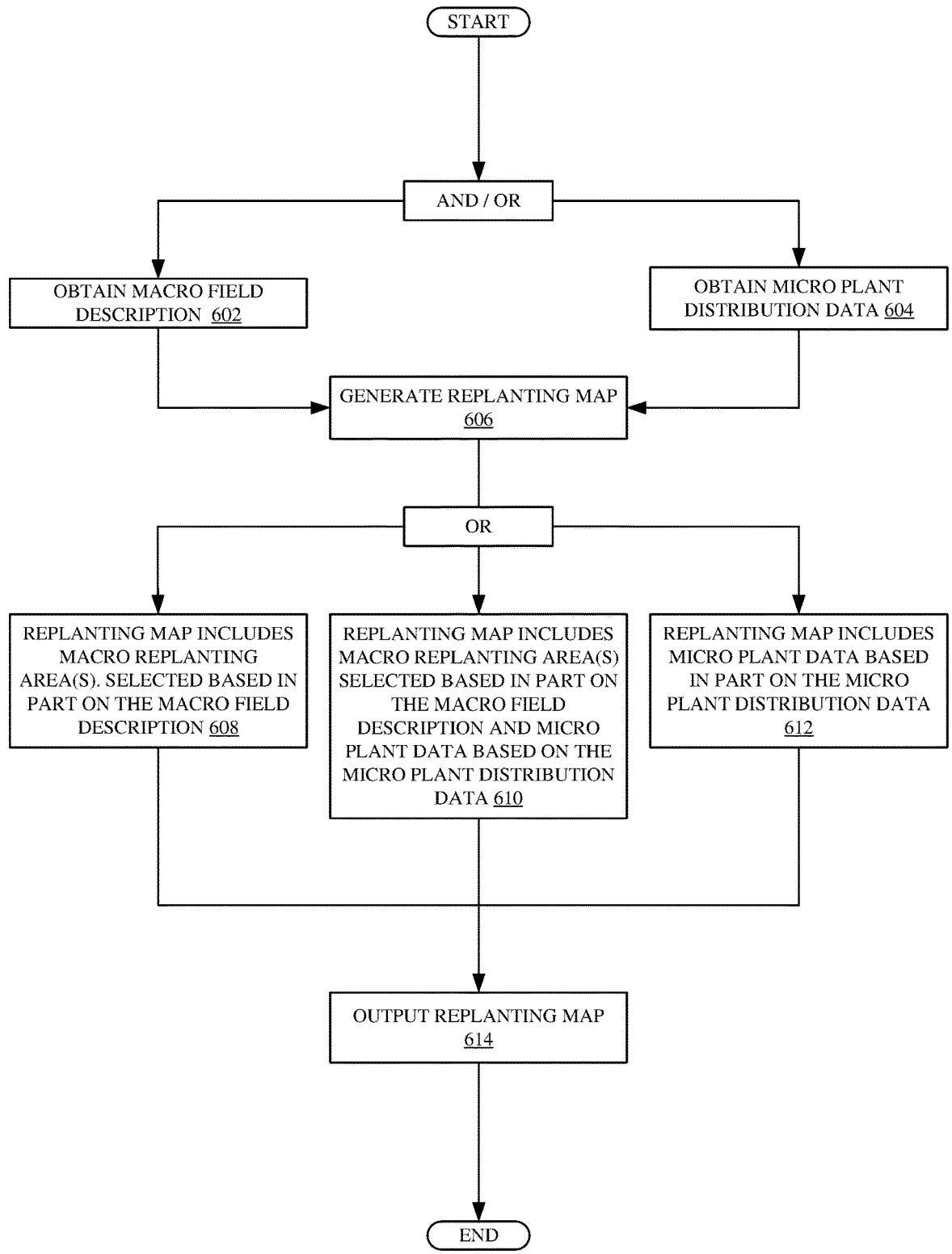
FIG. 6 is a block flow diagram showing an example of operation of the seed planting machine.

FIG. 6 is a flow diagram illustrating an example of operation of seed planting machine (e.g., machine 400) in conjunction with a replanting map (e.g., replanting map 407). As is indicated by blocks 602 and 604, the flow begins with acquisition of a macro field description (e.g., macro field description 405) and/or micro plant distribution data (e.g., micro plant distribution data 409). Either (or both) of these data sets is utilized as a basis for generating the replanting map. This is indicated by block 606 in FIG. 6. As is indicated by block 608, the generated replanting map illustratively includes one or more macro replanting areas (e.g., macro replanting areas 434) based in part on the macro field description. As indicated by block 612, the generated replanting map includes micro replanting data (e.g., data 411, 413, 426, 428, 430, 432 and/or 436) based in part on the micro plant distribution data. Or, as is indicated by block 610, both categories of data are included in the replanting map. As is indicated by block 614, the process ends when the replanting map is output. The process of FIG. 6 can be repeated any number of times to produce new replanting maps or at least updates to an existing replanting map.

Figure 7:
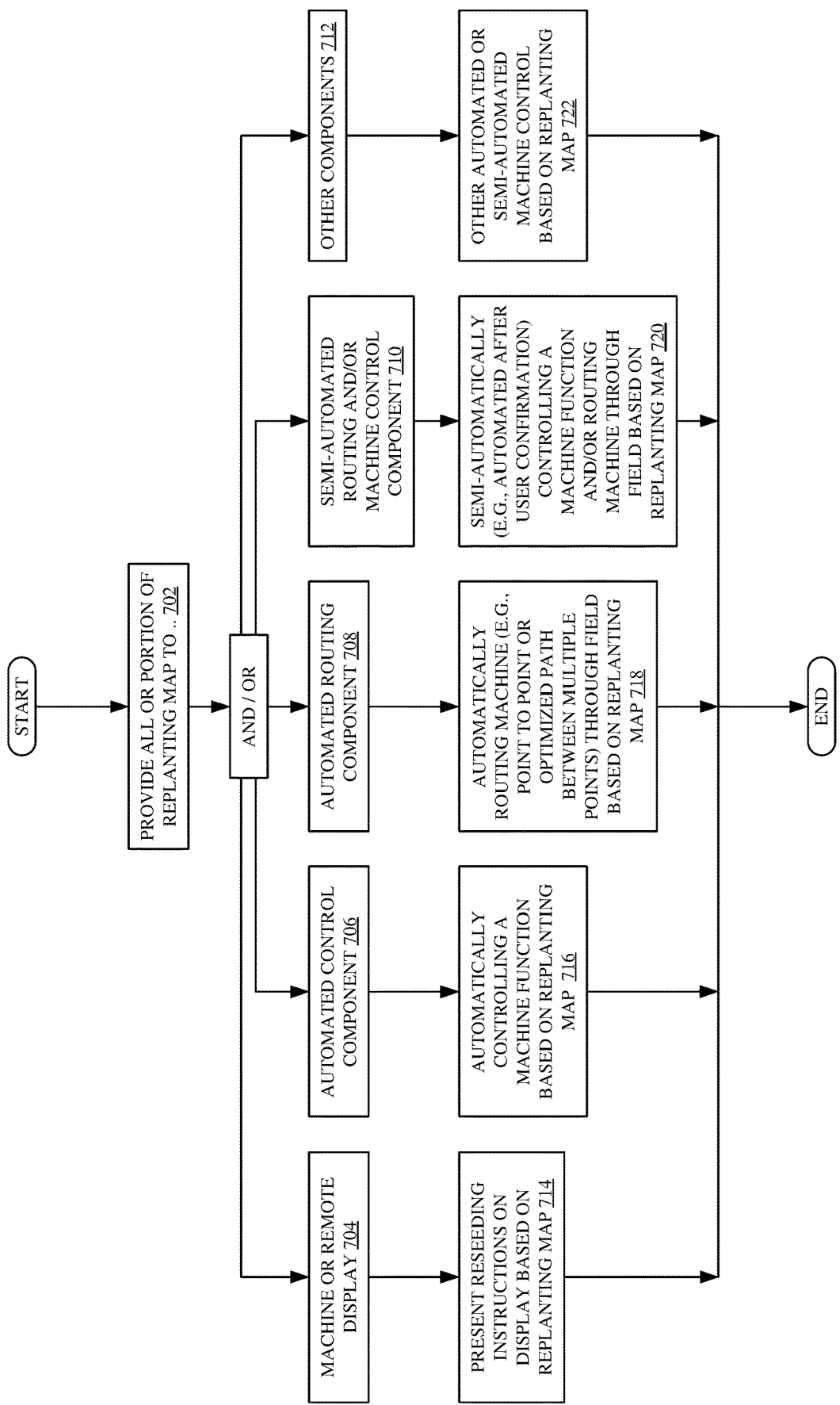
FIG. 7 is a block flow diagram showing another example of operation of the seed planting machine.

FIG. 7 is a flow diagram illustrating another example of operation of a seed planting machine (e.g., machine 400). The process begins with provision of all or a portion of a replanting map (e.g., replanting map 407). The replanting map then influences functions performed by any or all of a machine or remote display 704, an automated control component 706, an automated routing component 708, semi-automated routing and/or machine control components 710, or other components 712.

As is indicated by block 714, when the replanting map influences functionality of component 704, it is illustratively utilized as a basis for presenting reseeding instructions on a machine or remote display (e.g., display 410 or 416). These instructions can include indications as to where in a field replanting is calculated to be desirable or not desirable.

As is indicated by block 716, when the replanting map influences functionality of component 706, it is utilized as the basis for automatically controlling a function of the machine based on the reseeding map. For example, seed planting equipment can be raised or lowered based on indications in the replanting map of where in a field replanting is calculated to be desirable or not desirable.

As is indicated by block 718, when replanting map influences functionality of component 708, it is illustratively utilized as the basis for automatically routing the machine through a field. For example, the machine can be automatically routed based on indications in the replanting map as to where in a field replanting is calculated to be desirable or not desirable. In one example, this automated routing is point-to-point routing between identified reseeding areas. In another example, the automated routing is routing along an automatically determined optimized or otherwise prioritized path between three or more identified reseeding areas.

As is indicated by block 720, when the replanting map influences functionality of component 710, it is utilized as the basis for influencing the semi-automatic routing of the machine through a field and/or the semi-automatic control of a functionality of the machine. In other words, control of the machine based on the reseeding map need not necessarily be entirely automated. It could just as easily be semi-automated. For example, any automated routing or control of the machine can require a user confirmation or selection input before being automatically acted upon.

Finally, as is indicated by block 722, when the replanting map influences functionality of component 722, it is utilized as the basis for influencing other automated or semi-automated machine control processes. Such other functions can include a component that creates a historical record of locations of field areas with varying planting characteristics. For example, this data can be subsequently referenced in other planting seasons as another input calculated into the creation of a reseeding map. This is just one of many additional possibilities.

The process of FIG. 7 can be repeated any number of times. For example, the production of new or updated reseeding maps can trigger a repeating of the process.

The present discussion has mentioned or inferred processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been inferred or discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been inferred or discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 407 can be output to the cloud.

Figure 8:
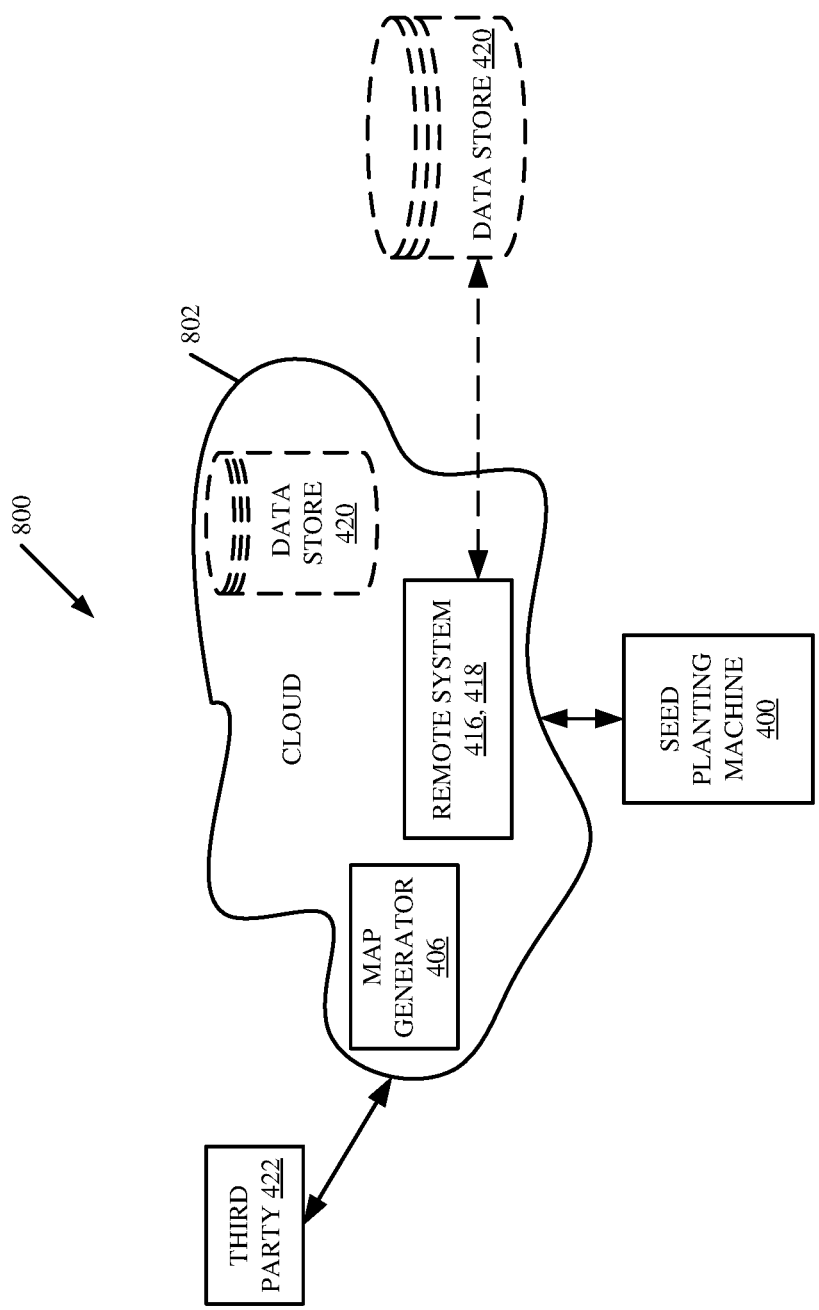
FIG. 8 is a schematic block diagram of the seed planting machine.

FIG. 8 is a block diagram of seed planting machine 400, represented in FIG. 4, except that it communicates with elements in a remote server architecture 800. In an example embodiment, remote server architecture 800 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 4, as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 8, some items are similar to those shown in FIG. 4 and they are similarly numbered. FIG. 8 specifically shows that map generator 406, systems 416 and 418 and storage 420 can be located at a remote server location 802. Therefore, seed planting machine 400 accesses those systems through remote server location 802.

FIG. 8 also depicts another embodiment of a remote server architecture. FIG. 8 shows that it is also contemplated that some elements of FIG. 4 are disposed at remote server location 802 while others are not. By way of example, remote storage 420 or third-party systems 422 can be disposed at a location separate from location 802, and accessed through the remote server at location 802. Regardless of where they are located, they can be accessed directly by seed planting machine 400, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the seed planting machine comes close to the fuel truck for fueling, the system automatically collects the information from the seed planting machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the seed planting machine until the seed planting machine enters a covered location. The seed planting machine, itself, can then send the information to the main network.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
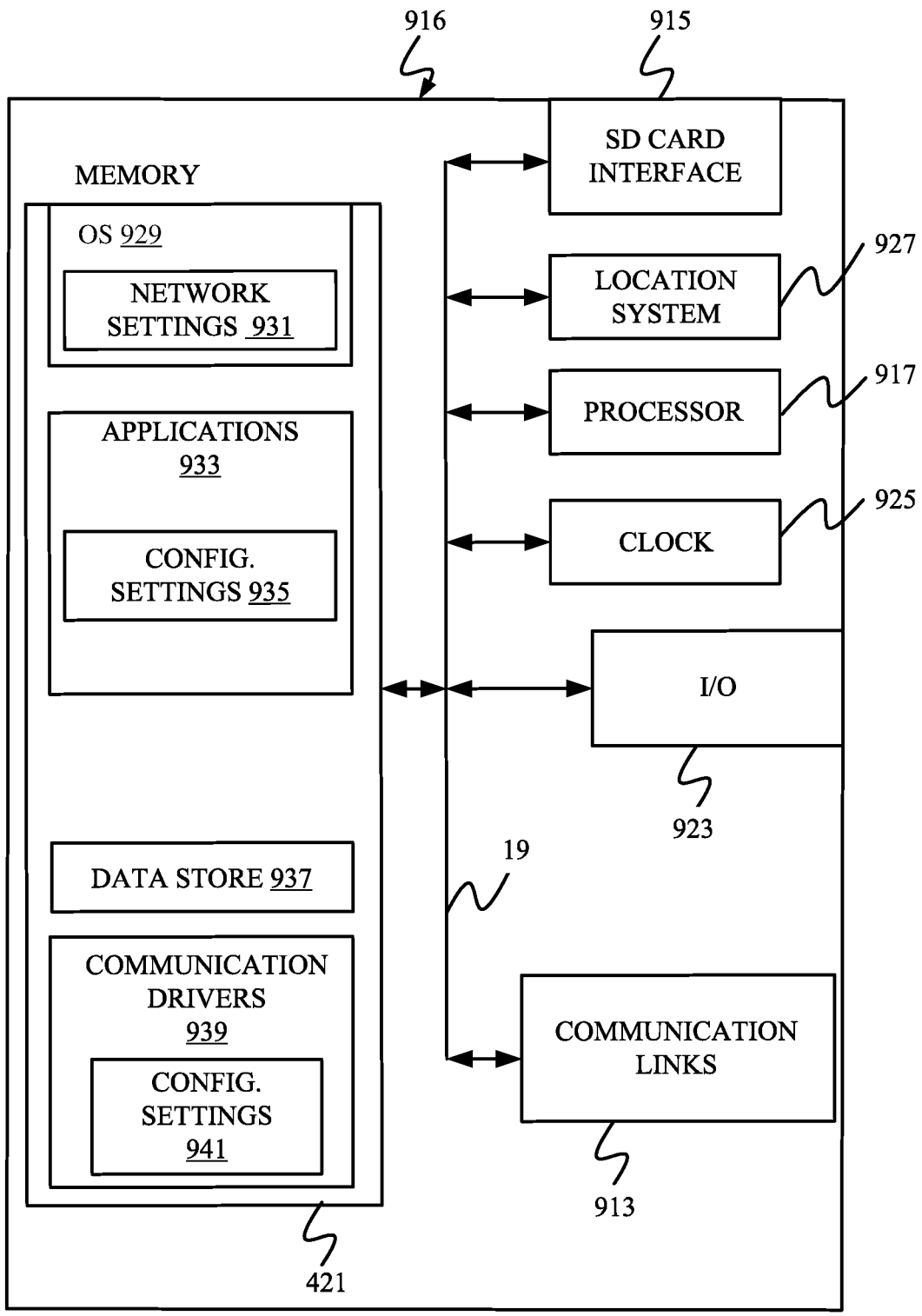
FIG. 9 is a simplified block diagram of a handheld or mobile computing device.
Figure 10:
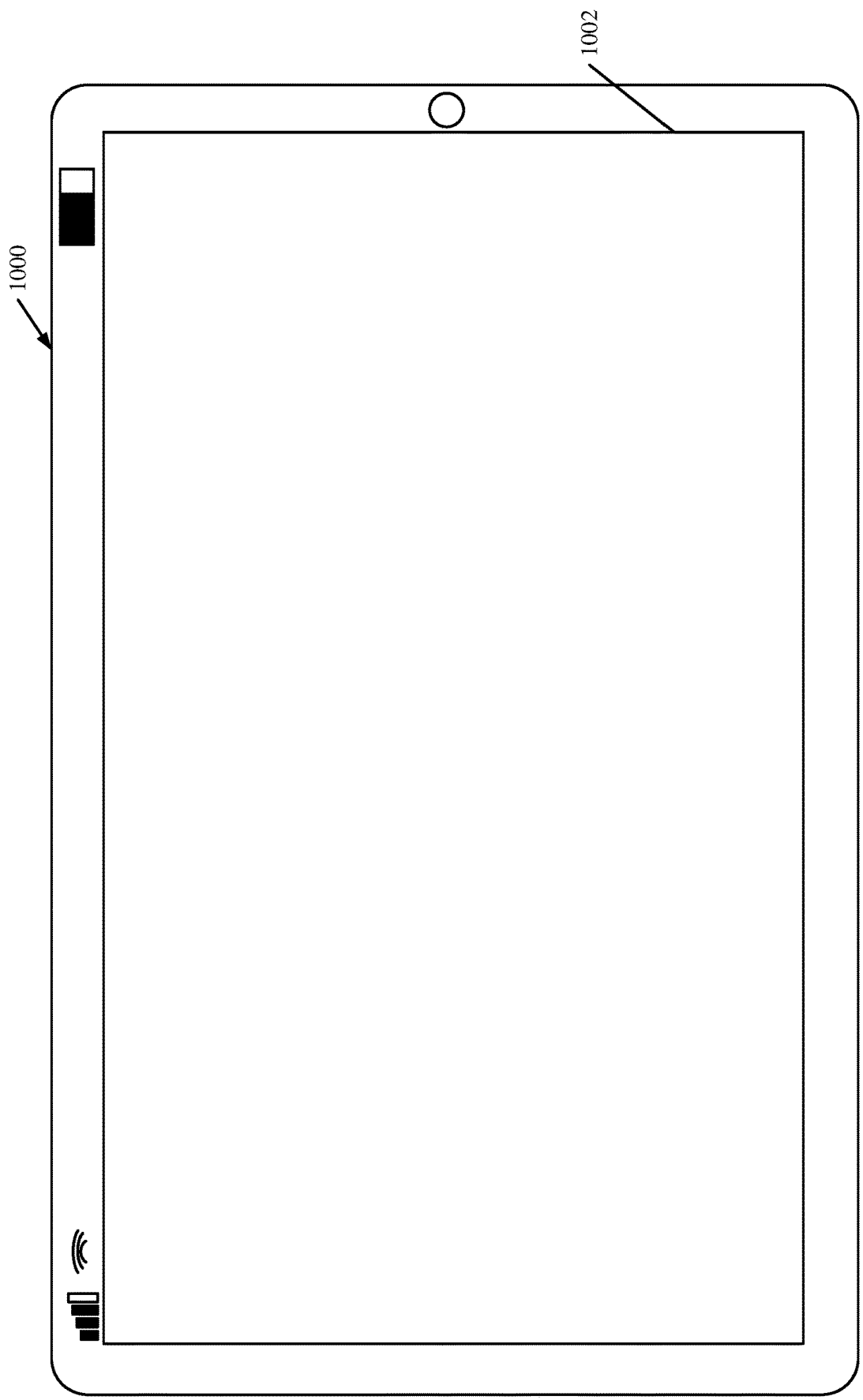
FIG. 10 is an illustration of a tablet computer.
Figure 11:
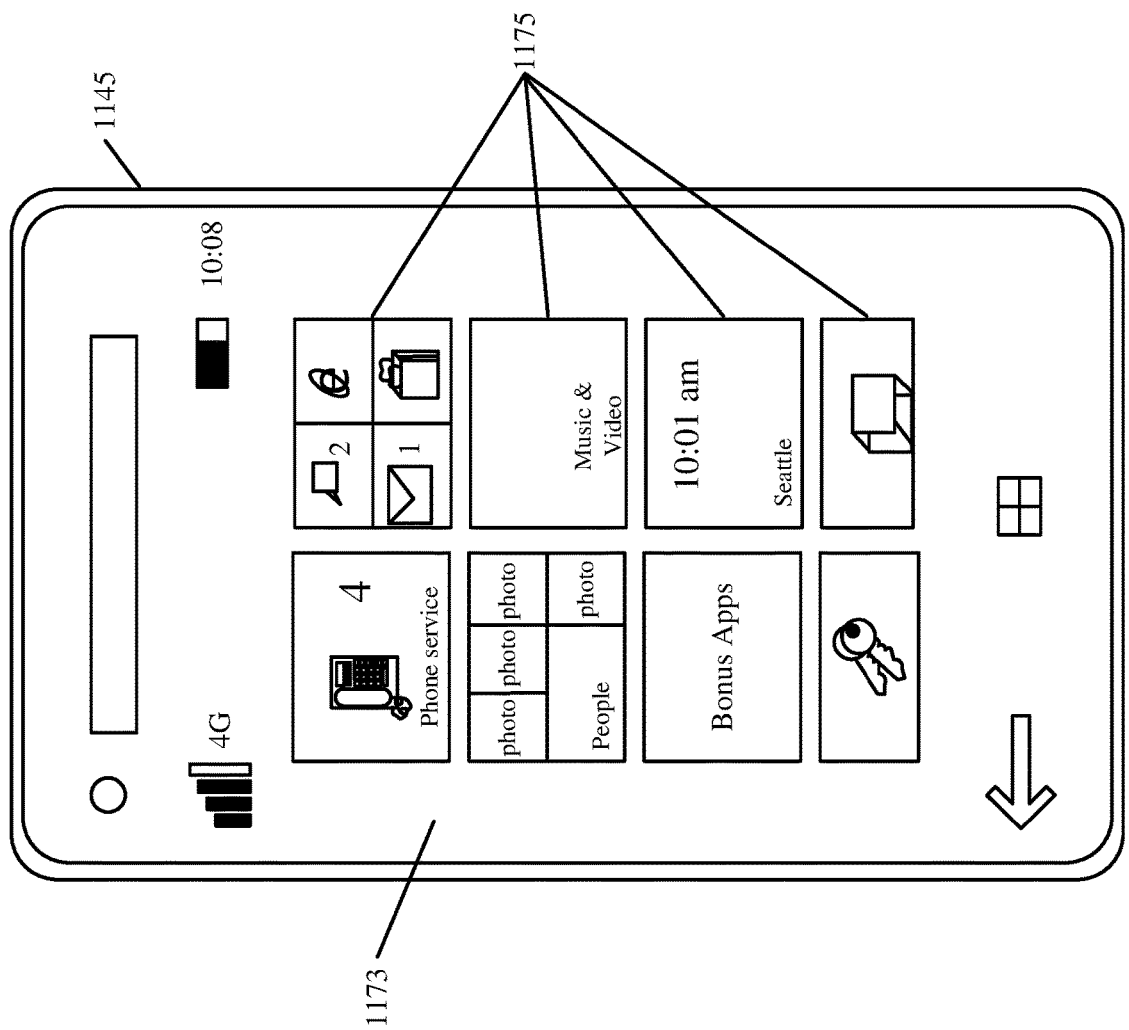
FIG. 11 is an illustration of a phone.
Figure 12:
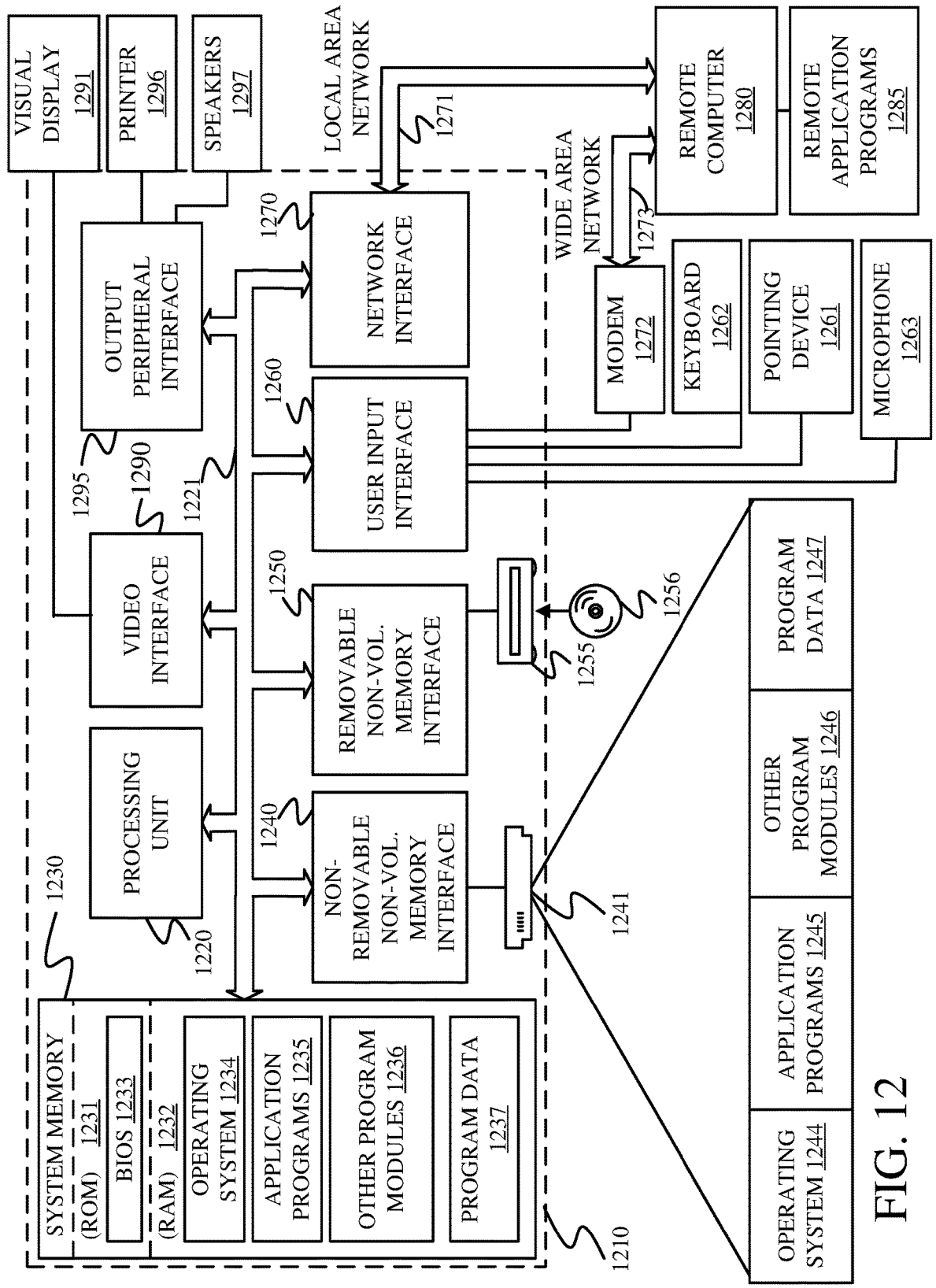
FIG. 12 is a schematic representation of a computing environment.

FIG. 9 is a simplified block diagram of one illustrative embodiment of a handheld or mobile computing device that can be used as a user's or client's hand held device 916, in which the present system (or parts of it) can be deployed. For instance, a mobile device can be deployed in the operator compartment of seed planting machine 400 for use in generating, processing, or displaying reseeding information and/or instructions. FIGS. 10-12 are more specific examples of handheld or mobile devices.

FIG. 9 provides a general block diagram of the components of a client device 916 that can run some components shown in FIG. 4, that interacts with them, or both. In the device 916, a communications link 913 is provided that allows the handheld device to communicate with other computing devices and under some embodiments provides a channel for receiving information automatically, such as by scanning. Examples of communications link 913 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 915. Interface 915 and communication links 913 communicate with a processor 917 (which can also embody processor 408 from FIG. 4) along a bus 919 that is also connected to memory 921 and input/output (I/O) components 923, as well as clock 925 and location system 927.

I/O components 923, in one embodiment, are provided to facilitate input and output operations. I/O components 923 for various embodiments of the device 916 can include input components such as buttons, touch sensors, optical sensors, microphones, touch screens, proximity sensors, accelerometers, orientation sensors and output components such as a display device, a speaker, and or a printer port. Other I/O components 923 can be used as well.

Clock 925 illustratively comprises a real time clock component that outputs a time and date. It can also, illustratively, provide timing functions for processor 917.

Location system 927 illustratively includes a component that outputs a current geographical location of device 916. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 921 stores operating system 929, network settings 931, applications 933, application configuration settings 935, data store 937, communication drivers 939, and communication configuration settings 941. Memory 921 can include all types of tangible volatile and non-volatile computer-readable memory devices. It can also include computer storage media (described below). Memory 921 stores computer readable instructions that, when executed by processor 917, cause the processor to perform computer-implemented steps or functions according to the instructions. Processor 917 can be activated by other components to facilitate their functionality as well.

FIG. 10 shows one embodiment in which device 916 is a tablet computer 1000. In FIG. 10, computer 1000 is shown with user interface display screen 1002. Screen 1002 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 1000 can also illustratively receive voice inputs as well.

FIG. 11 provides an additional example of devices 916 that can be used, although others can be used as well. In FIG. 11, a feature phone, smart phone or mobile phone 1145 is provided as the device 916. Phone 1145 includes a display 1173 capable of displaying images including application images, icons, web pages, photographs, and video, and control buttons 1175 for selecting items shown on the display. The phone includes an antenna for receiving cellular phone signals. In some embodiments, phone 1145 also includes a Secure Digital (SD) card slot that accepts an SD card. Display 1173 is illustratively a touch sensitive display that displays control buttons 1175 as icons or tiles or other user input mechanisms. Control buttons 1175 can be used by a user to run applications, make calls, perform data transfer operations, etc. Phone 1145 is illustratively built on a mobile operating system.

Note that other forms of the devices 916 are possible.

FIG. 12 is one embodiment of a computing environment in which elements of FIG. 4, or parts of it, (for example) can be deployed. With reference to FIG. 12, an example system for implementing some embodiments includes a general-purpose computing device in the form of a computer 1210. Components of computer 1210 may include, but are not limited to, a processing unit 1220 (which can comprise processor 408), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to FIG. 4 can be deployed in corresponding portions of FIG. 12.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, an optical disk drive 1255, and non-volatile optical disk 1256. The hard disk drive 1241 is typically connected to the system bus 1221 through a non-removable memory interface such as interface 1240, and optical disk drive 1255 is typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 12 illustrates, for example, that remote application programs 1285 can reside on remote computer 1280.

It should also be noted that the different embodiments described herein can be combined in different ways. That is, parts of one or more embodiments can be combined with parts of one or more other embodiments. All of this is contemplated herein.

Example 1 is an agricultural machine, comprising:
a processor that receives a replanting map from a map generator, the replanting map designating a particular area in a field in which it is recommended to add additional seeds to an area of previously planted seeds that are remain in an early stage of growth; and
a component of the agricultural machine that automatically controls a function of the agricultural machine based at least in part on the replanting map so as to facilitate planting additional seeds in the designated particular area.

Example 2 is the agricultural machine of any or all previous examples wherein the map generator receives a macro description of characteristics of the field from a topographical data retrieval component, wherein this macro description of characteristics is calculated by the map generator into a selection of the particular area as said designated area.

Example 3 is the agricultural machine of any or all previous examples wherein said component of the agricultural machine is an automated routing component, and wherein said automatically controlling a function of the agricultural machine comprises facilitating an at least partially automated movement of the machine from a current location to the designated particular area.

Example 4 is the agricultural machine of any or all previous examples wherein said at least partially automated movement of the machine is an at least partially automated movement of the machine along a route calculated to be an optimized path between multiple separate areas in the field that include the designated area.

Example 5 is the agricultural machine of any or all previous examples wherein each of the multiple separate areas in the field is designated in the replanting map as a macro replanting candidate area.

Example 6 is the agricultural machine of any or all previous examples wherein the replanting map includes an indication of the optimized path.

Example 7 is the agricultural machine of any or all previous examples wherein the map generator receives a collection of micro plant distribution data from a sensor, wherein this micro plant distribution data is calculated by the map generator into a selection of the particular area as said designated area.

Example 8 is the agricultural machine of any or all previous examples wherein said component of the agricultural machine is an automated control component, and wherein said automatically controlling a function of the agricultural machine comprises facilitating an at least partially automated activation of seed planting equipment.

Example 9 is the agricultural machine of any or all previous examples wherein the sensor is a camera.

Example 10 is the agricultural machine of any or all previous examples wherein the collection of micro plant distribution data is an indication of a density of plants growing in the particular area.

Example 11 is the agricultural machine of any or all previous examples wherein the map generator receives a macro description of characteristics of the field from a topographical data retrieval component, wherein this macro description of characteristics is calculated by the map generator into a selection of the particular area as said designated area.

Example 12 is a method of controlling functions of a seed planting machine, comprising:
receiving a macro description of topographical characteristics of a field;
receiving a collection of micro plant distribution data;
automatically controlling the functions of the seed planting machine based in part on a determination that both of said macro description and the collection of micro plant distribution data is indicative of an undesirable future crop yield.

Example 13 is the method of any or all previous examples wherein automatically controlling comprises automatically routing the seed planting machine between locations in the field.

Example 14 is the method of any or all previous examples wherein automatically routing the seed planting machine comprises automatically routing based at least in part on the macro description of topographical characteristics of the field.

Example 15 is the method of any or all previous examples wherein automatically controlling comprises facilitating an at least partially automated activation of seed planting equipment.

Example 16 is the method of any or all previous examples wherein facilitating the at least partially automated activation of seed planting equipment comprises facilitating the at least partially automated activation based at least in part on the collection of micro plant distribution data.

Example 17 is a method of selectively replanting seeds in a field, comprising:
sensing plant distribution data as a seed planting machine moves through the field;
identifying, based on analysis of the plant distribution data, an area in the field likely to have an undesirable future crop yield; and
automatically controlling a function of the seed planting machine based at least in part on the identification of the area.

Example 18 is the method of any or all previous examples wherein identifying the area in the field is further based on analysis of topographical characteristics of the field.

Example 19 is the method of any or all previous examples wherein automatically controlling the function comprises automatically activating seed planting equipment.

Example 20 is the method of any or all previous examples wherein sensing comprises sensing using a sensor that is unattached to the seed planting machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. An agricultural planting machine, comprising:
a processor that receives a replanting map from a map generator, the replanting map designating a particular area in a field in which it is likely that plant growth is below a threshold level; and
a sensor that generates plant distribution data for the designated particular area during a replanting operation; and
a component of the agricultural machine that automatically controls a function of seed planting equipment of the agricultural planting machine in the designated particular area based on the plant distribution data generated by the sensor during the replanting operation.

2. The agricultural planting machine of claim 1, wherein the map generator receives topographical a description of topographical characteristics of the field from a topographical data retrieval component, wherein this description of topographical characteristics is calculated by the map generator into a selection of the particular area as said designated area.

3. The agricultural planting machine of claim 2 and further comprising an automated routing component that facilitates an at least partially automated movement of the agricultural planting machine from a current location to the designated particular area.

4. The agricultural planting machine of claim 3, wherein the replanting map designates as plurality of particular areas in the field in which it is likely that plant growth is below the threshold level and wherein said at least partially automated movement of the agricultural planting machine is an at least partially automated movement of the machine along a route between the plurality of designated particular areas.

5. The agricultural planting machine of claim 4, wherein the sensor generates plant distribution data for each designated particular area of the plurality of designated particular areas and wherein the component of the agricultural machine automatically controls a function of the seed planting equipment of the agricultural machine in each particular designated area based on the corresponding plant distribution data for each designated particular area generated by the sensor.

6. The agricultural planting machine of claim 5, wherein the replanting map includes an indication of the route.

7. The agricultural planting machine of claim 1, wherein processor compares the plant distribution data to a threshold plant distribution value and wherein the component of the agricultural machine controls the function of the seed planting equipment of the agricultural planting machine in the designated particular area based on the comparison.

8. The agricultural planting machine of claim 7, wherein the sensor is a camera.

9. The agricultural planting machine of claim 8, wherein the processor determines a density of plants, in the designated particular area, based on an image captured by the camera.

10. The agricultural planting machine of claim 9, wherein the threshold plant distribution value comprises a threshold plant density value.

11. The agricultural planting machine of claim 10, wherein the map generator receives a description of topographical characteristics of the field from a topographical data retrieval component and a description of precipitation at the field, wherein each of the description of topographical characteristics and the description of precipitation is calculated by the map generator into a selection of the particular area as said designated area.

12. A method of controlling functions of a seed planting machine, comprising:
receiving a description of topographical characteristics of a field;
generating a map that designates a particular area in the field in which it is likely that plant growth is below a threshold level;
controlling the seed planting machine to travel to the designated particular area in the field based on the map;
generating, with a sensor on the seed planting machine, plant distribution data for plants in the designated particular area in the field while the seed planting machine is in the designated particular area in the field;
automatically controlling the functions of the seed planting machine in the designated particular area in the field based on the plant distribution data for the plants in the designated particular area in the field generated by the sensor.

13. The method of claim 12, wherein controlling the seed planting machine to travel to the designated particular area in the field comprises automatically generating a route for the seed planting machine to the designated particular area in the field.

14. The method of claim 13, wherein controlling the seed planting machine to travel to the designated particular area in the field comprises automatically controlling a component of the seed planting machine to drive the seed planting machine along the route.

15. The method of claim 12, wherein automatically controlling the functions of the seed planting machine in the designated particular area in the field comprises facilitating an at least partially automated activation or deactivation of seed planting equipment of the seed planting machine in the designated particular area in the field.

16. The method of claim 15, wherein the sensor comprises an imaging system and wherein the plant distribution data comprises an image of the plants in the designated particular area, the method further comprising determining the density of the plants in the designated area based on the image and comparing the density of the plants to a plant density threshold, wherein automatically controlling the functions of the seed planting machine in the designated particular area in the field comprises automatically controlling the functions of the seed planting machine in the designated particular area in the field based on the comparison distribution data.

17. An agricultural system comprising:
a map generator configured to:
receive georeferenced data indicative of a characteristic of a field;
receive weather data indicative of weather after the field has been planted; and
generate a replanting map that includes an indication designating a particular area of the field as an area in which reduced crop growth is based on the georeferenced data and the weather data;
a routing component configured to generate a route for an agricultural planting machine to the designated particular area of the field;
a processor configured to:
receive sensor data from a sensor on the agricultural planting machine while the agricultural planting machine is in the designated particular area, the Sensor data indicative of a density of plants in the designated particular area; and
compare the sensed density of plants in the designated particular area to a density threshold; and
a component configured to automatically control activation or deactivation of seed planting equipment of the agricultural planting machine in the designated particular area based on the comparison of the sensed density of plants in the designated particular area to the density threshold.

18. The agricultural system of claim 17, wherein the georeferenced data is indicative of a topography of the field and wherein the weather data is indicative of an amount of precipitation.

19. The agricultural system of claim 17, wherein activation of the seed planting equipment of the agricultural planting machine includes lowering the seed planting equipment of the agricultural planting machine and wherein deactivation of the seed planting equipment of the agricultural planting machine includes raising the seed planting equipment act the agricultural planting machine.

20. The agricultural system of claim 17, wherein the sensor is an image detection system.

\* \* \* \* \*

UNITED STATES PATENT AND TRADEMARK OFFICE
CERTIFICATE OF CORRECTION

| | |
|---|---|
| PATENT NO. | : 11,589,496 B2 |
| APPLICATION NO. | : 16/735147 |
| DATED | : February 28, 2023 |
| INVENTOR(S) | : Bradley W. Van De Woestyne and Timothy A. Wilcox |

It is certified that error appears in the above-identified patent and that said Letters Patent is hereby corrected as shown below:

On the Title Page

Column 1, (72) Bradley W. Van De Woestyne, delete "Wes" insert --West--

Signed and Sealed this
Twenty-fifth Day of April, 2023

*Katherine Kelly Vidal*

Katherine Kelly Vidal
*Director of the United States Patent and Trademark Office*